No. 800,077. PATENTED SEPT. 19, 1905.
J. C. COLLINS.
LARD COOLING MACHINE.
APPLICATION FILED MAY 1, 1905.
2 SHEETS—SHEET 1.
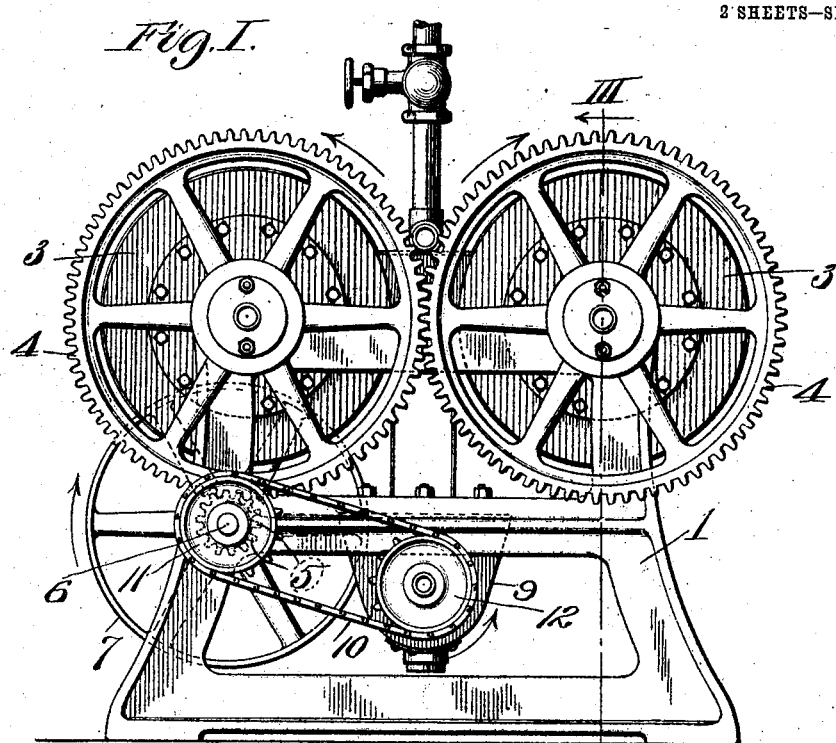
Fig. I.
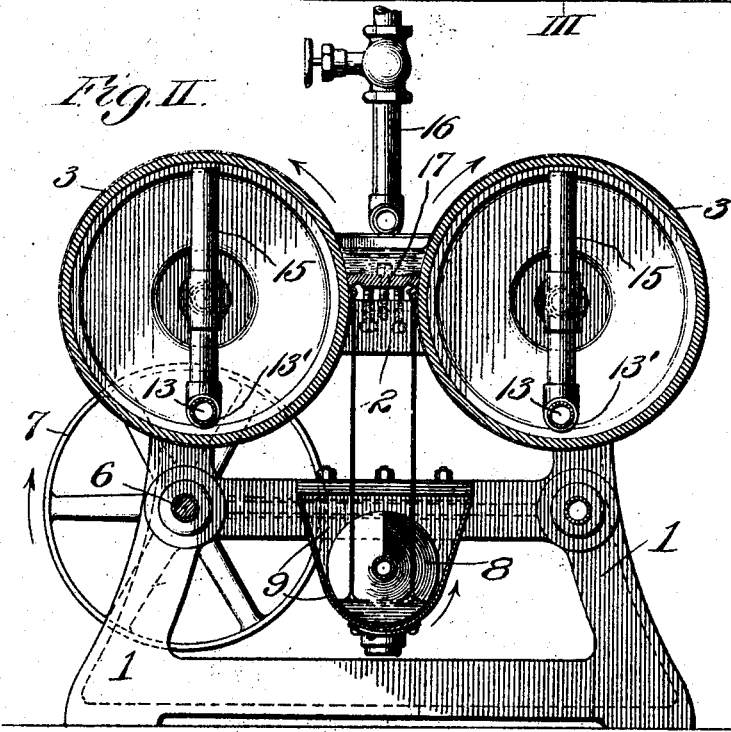
Fig. II.
Witnesses: Inventor:
John C. Collins,
by Knight & Bro. attys.

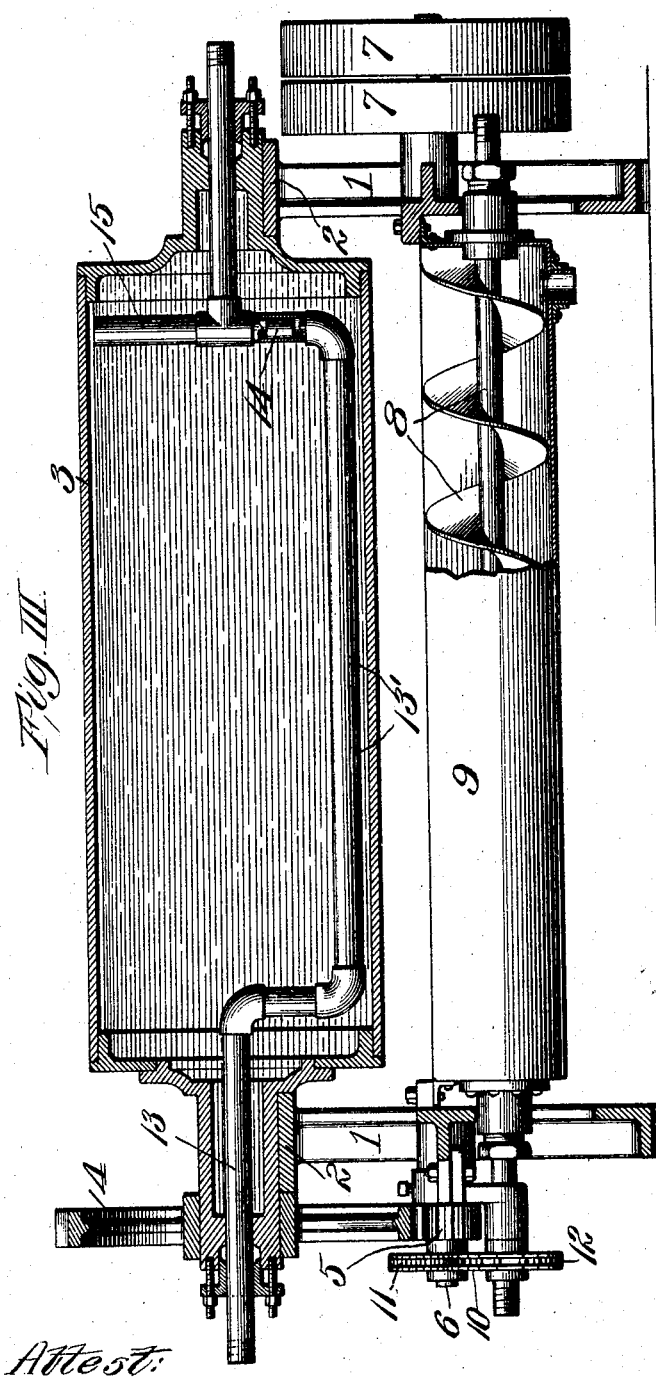

UNITED STATES PATENT OFFICE.

JOHN C. COLLINS, OF ST. LOUIS, MISSOURI, ASSIGNOR TO GUS V. BRECHT BUTCHERS' SUPPLY COMPANY, OF ST. LOUIS, MISSOURI, A CORPORATION.

LARD-COOLING MACHINE.

No. 800,077. Specification of Letters Patent. Patented Sept. 19, 1905.

Application filed May 1, 1905. Serial No. 258,155.

*To all whom it may concern:*

Be it known that I, JOHN C. COLLINS, a citizen of the United States, residing in the city of St. Louis, in the State of Missouri, have invented certain new and useful Improvements in Lard-Cooling Machines, of which the following is a full, clear, and exact description, reference being had to the accompanying drawings, forming part of this specification.

My invention relates to a machine for cooling lard compounds which require to be cooled after they are compounded in order to prevent the separation of their ingredients.

Figure I is an end elevation of my machine. Fig. II is a transverse vertical section. Fig. III is an enlarged vertical longitudinal section taken on line III III, Fig. I, and with the conveyer-pan shown partly in section on a line offset from the line III III. Fig. IV is an enlarged vertical section taken through fragments of the cooling-cylinders and through the scraper and trough members situated between the cylinders. Fig. V is a perspective view of one end of the scraper and one of the end trough members. Fig. VI is an enlarged section taken on line VI VI, Fig. IV.

1 designates the end frames of my machine, each of which includes a top cross-piece 2.

3 designates a pair of cylinders located parallel with each other and having spindles at their ends that are mounted in suitable bearing-boxes fitted to the frame cross-pieces 2. These cylinders are rotated in upward and outward directions, as indicated by the arrows, Figs. I and II, the cylinders being driven in opposite directions. The rotation may be imparted to the cylinders by any suitable means, that shown consisting of a spur-wheel 4, fixed to one of the spindles of each cylinder and intermeshing with each other, and a pinion 5, fixed to a shaft 6, journaled in the end frames of the machine and equipped with a band-pulley 7. The shaft 6 also serves to drive a conveyer 8, that operates in a pan 9 and is driven through the medium of an endless chain 10, which travels on toothed wheels 11 and 12, fixed, respectively, to the shaft 6 and the shaft of the conveyer.

13 designates brine-conducting pipes, which lead into the cylinders 3 and which are provided interior of the cylinders with perforations through which the brine may be discharged. The perforated portions of the pipes are preferably located at the bottoms of the cylinders in order that the brine will be discharged at such location. The pipe 13 enters each cylinder through one of its spindles and emerges from the cylinder through the other spindle to discharge the brine as the warmer portion thereof rises to the top of the chamber in the cylinder. To provide for such discharge, I place in each conducting-pipe at the end farthest from its entrance into the cylinder a plug 14, (see Fig. III,) which prevents the flow of brine through that end of the pipe and necessitates its escape through the perforations 13'.

15 is a warm-brine-receiving pipe that is open at its upper end to receive the brine ascending to the top of the cylinder and discharge it into the outlet portion of pipe leading from the cylinder.

16 designates a lard-compound-conducting pipe which extends into a position between or above the cooling-cylinders 3.

17 designates a scraper having concaved sides 18 and provided at the bottoms of its sides with knife-edges 19. This scraper fits between the two cooling-cylinders 3, so that its concaved sides bear against said cylinders and are fitted closely thereto. The ends of the scraper surmount the end frame cross-pieces 2 of the machine, and the scraper is adjustably held to said cross-pieces by retaining-screws 17'. The scraper rests upon adjustment-screws 20, which pass upwardly through the frame cross-pieces. These adjustment-screws are of utility in holding the scraper in position and in close-fitting bearing against the cooling-cylinders, and they also provide for the downward adjustment of the scraper when its sides become worn due to friction thereagainst by the cooling-cylinders.

21 designates end blocks surmounting the scraper 17 and extending transversely thereof adjacent to its ends and which, with said scraper, serve to form a trough into which the lard compound to be cooled is discharged from the conveying-pipe 16. For the purpose of securing tight joints between the ends of the end blocks and the cooling-cylinders which oppose the ends of these blocks I slot each end block vertically at its ends and place in the slots packing-strips 22, that are backed by springs 23, which serve to hold the packing-strips projected outwardly and against the cooling-cylinders. These packing-strips rest upon the scraper, and they are confined at their upper ends by retaining-strips 24, secured to the end blocks, as seen in Fig. IV.

In the practical use of my machine brine is constantly conveyed into the cooling-cylinders to maintain a low temperature therein, and the cylinders are rotated in opposite directions, as before stated, whereby the circumferential surfaces of the cylinders travel upwardly and move in contact with the sides of the scraper 17 and its knife-edges 19. The lard compound in liquid condition is discharged into the trough formed of the scraper and end blocks and its packing members, and as the cylinders revolve they in their cooled condition gather the liquid compound thereon in a congealed state, and this congealed lard compound remains adhered to the cylinders until they have completed their revolutions, when it is scraped from each cylinder by the scraper knife-edges and descends into the conveyer-pan 9, as illustrated in Fig. II. This action goes on continuously during the time that the machine is in operation.

I claim as my invention—

1. In a lard-cooling machine, the combination of a pair of cooling-cylinders, means for rotating said cylinders means for maintaining said cylinders in cooled condition, and a scraper located intermediate of said cylinders and operating against both of them in common, substantially as set forth.

2. In a lard-cooling machine, the combination of a pair of cooling-cylinders, means for rotating said cylinders means for maintaining said cylinders in cooled condition, a scraper located intermediate of said cylinders and operating against both of them in common, and means associated with said scraper for forming a trough between said cylinders of which said scraper constitutes the lower side, substantially as set forth.

3. In a lard-cooling machine, the combination of a pair of cooling-cylinders, means for rotating said cylinders means for maintaining said cylinders in cooled condition, a scraper located intermediate of said cylinders and operating against both of them in common, and end blocks surmounting said scraper and constituting the end walls of a trough of which said scraper constitutes the bottom, substantially as set forth.

4. In a lard-cooling machine, the combination of a pair of cooling-cylinders, means for rotating said cylinders means for maintaining said cylinders in cooled condition, a scraper located intermediate of said cylinders and operating against both of them in common, end blocks surmounting said scraper and constituting the end walls of a trough of which said scraper constitutes the bottom, and packing members seated in said end blocks and bearing against said cylinders, substantially as set forth.

5. In a lard-cooling machine, the combination of a pair of cooling-cylinders, means for rotating said cylinders means for maintaining said cylinders in cooled condition, a scraper located intermediate of said cylinders and operating against both of them in common, end blocks surmounting said scraper and constituting the end walls of a trough of which said scraper constitutes the bottom, and spring-pressed packing members seated in said end blocks and bearing against said cylinders, substantially as set forth.

6. In a lard-cooling machine, the combination of a pair of cooling-cylinders, means for rotating said cylinders means for maintaining said cylinders in a cooled condition, and a scraper located intermediate of said cylinders and bearing against both of them in common; said scraper having knife-edges at the bottoms of its sides, substantially as set forth.

7. In a lard-cooling machine, the combination of a pair of cooling-cylinders, means for rotating said cylinders means for maintaining said cylinders in a cooled condition, a scraper located intermediate of said cylinders and operating against both of them in common, and means for adjusting said scraper in a downward direction between said cylinders, substantially as set forth.

8. In a lard-cooling machine, the combination of a pair of cooling-cylinders, means for rotating said cylinders means for maintaining said cylinders in a cooled condition, end frames to which said cylinders are journaled, a scraper located intermediate of said cylinders and bearing in common against them, and adjustment-screws supporting said scraper and seated in said end frames, substantially as set forth.

In testimony whereof I have hereunto set my hand this 26th day of April, 1905.

JOHN C. COLLINS.

In presence of—
 E. S. KNIGHT,
 NELLIE V. ALEXANDER.